US008919729B2

(12) United States Patent
Miller et al.

(10) Patent No.: US 8,919,729 B2
(45) Date of Patent: Dec. 30, 2014

(54) ADJUSTABLE THERMAL FORMING DIE ASSEMBLY

(75) Inventors: Daniel S. Miller, Austin, MN (US);
Steven E. Sampson, Saint Ansgar, IA (US); LouJean Reid, Austin, MN (US); Frank D. Fryer, Lyle, MN (US); Danny K. Petersen, Albert Lea, MN (US); Kurt A. Lindsey, Austin, MN (US)

(73) Assignee: Hormel Foods Corporation, Austin, MN (US)

( * ) Notice: Subject to any disclaimer, the term of this patent is extended or adjusted under 35 U.S.C. 154(b) by 66 days.

(21) Appl. No.: 13/106,513

(22) Filed: May 12, 2011

(65) Prior Publication Data
US 2012/0286446 A1    Nov. 15, 2012

(51) Int. Cl.
| B29C 33/34 | (2006.01) |
| B29C 43/32 | (2006.01) |
| B29C 51/36 | (2006.01) |
| B29C 51/10 | (2006.01) |
| B29C 51/18 | (2006.01) |
| B29C 49/48 | (2006.01) |

(52) U.S. Cl.
CPC ............... *B29C 51/36* (2013.01); *B29C 51/10* (2013.01); *B29C 51/18* (2013.01); *B29C 2049/4858* (2013.01); *B29C 2791/006* (2013.01)
USPC ............ 249/155; 249/156; 425/384; 425/388

(58) Field of Classification Search
USPC ............... 425/384, 387.1, 388; 264/549, 550; 249/155–156, 159
See application file for complete search history.

(56) References Cited

U.S. PATENT DOCUMENTS

| 1,881,088 | A | | 10/1932 | Matuschka |
| 2,187,511 | A | | 1/1940 | Baxter |
| 3,119,681 | A | * | 1/1964 | Vogelpohl .................. 65/356 |
| 3,452,389 | A | | 7/1969 | Felstehausen |

(Continued)

FOREIGN PATENT DOCUMENTS

| DE | 10 2007 029 637 A1 | 1/2009 |
| EP | 0 132 776 A2 | 2/1985 |
| EP | 0 403 373 A1 | 12/1990 |

OTHER PUBLICATIONS

Search Report for International Application Serial No. PCT/US2012/027864, mailed Nov. 14, 2012, 11 pages.

(Continued)

*Primary Examiner* — Joseph S Del Sole
*Assistant Examiner* — Thukhanh Nguyen
(74) *Attorney, Agent, or Firm* — IPLM Group, P.A.

(57) ABSTRACT

An adjustable thermal die assembly is provided. The thermal die assembly includes a thermal forming die and at least one insert. The thermal forming die has at least one die cavity of a select shape. The die further has at least one opening to the at least one die cavity. The at least one insert has at least one internal passage that is conformed to have a shape of the at least one opening to the at least one die cavity of the die. Moreover, the at least one insert is configured and arranged to be selectively coupled to the die with the at least one internal passage of the at least one insert aligning with the at least one opening of the at least one die cavity to selectively increase a depth of a forming cavity of the thermal forming assembly.

15 Claims, 5 Drawing Sheets

(56) References Cited

U.S. PATENT DOCUMENTS

| | | | |
|---|---|---|---|
| 3,671,008 A | 6/1972 | Villalba, Jr. | |
| 3,697,633 A * | 10/1972 | Edgar | 264/45.3 |
| 3,756,553 A | 9/1973 | Ranz | |
| 3,934,308 A | 1/1976 | Neri | |
| 3,958,395 A | 5/1976 | Reading | |
| 4,126,704 A | 11/1978 | McCarthy et al. | |
| 4,151,976 A | 5/1979 | Schurman | |
| 4,515,546 A * | 5/1985 | Medwed | 425/195 |
| 4,763,503 A | 8/1988 | Hughes et al. | |
| 4,790,740 A | 12/1988 | Pearlman | |
| 5,170,611 A | 12/1992 | Buchko et al. | |
| 5,205,110 A | 4/1993 | Buchko | |
| 5,421,544 A | 6/1995 | Roop | |
| 5,507,999 A * | 4/1996 | Copsey et al. | 425/388 |
| 6,021,995 A | 2/2000 | Cody | |
| 6,280,174 B1 * | 8/2001 | Lichtinger | 425/437 |
| 6,328,549 B1 * | 12/2001 | Valyi et al. | 425/388 |
| 6,811,802 B2 | 11/2004 | Van Esbroeck et al. | |
| 7,607,279 B2 | 10/2009 | Shackelford et al. | |

OTHER PUBLICATIONS

International Application Serial No. PCT/US2012/027864, Invitation to Pay Additional Fees and, Where Applicable, Protest Fee, mailed Jul. 19, 2012, 3 pages.

* cited by examiner

ADJUSTABLE THERMAL FORMING DIE ASSEMBLY

BACKGROUND

Plastic packaging is commonly used for products such as meats. It is often desired to have a package that is conformed to the shape of the product being packaged for sale. One method of achieving a desired shape of a package is by forming a plastic package with a thermal forming die. Different sized cavities in different thermal dies can produce different sized packages.

For the reasons stated above and for other reasons stated below which will become apparent to those skilled in the art upon reading and understanding the present specification, there is a need in the art for an effective and efficient apparatus and method of forming plastic packages of different sizes with the use of a single thermal forming die.

SUMMARY OF INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

In one embodiment, a thermal die assembly is provided. The thermal die assembly includes a thermal forming die and at least one insert. The thermal forming die has at least one die cavity of a select shape. The die further has at least one opening to the at least one die cavity. The at least one insert has at least one internal passage that is conformed to have a shape of the at least one opening to the at least one die cavity of the die. Moreover, the at least one insert is configured and arranged to be selectively coupled to the die with the at least one internal passage of the at least one insert aligning with the at least one opening of the at least one die cavity to selectively increase a depth of a forming cavity of the thermal forming assembly.

In yet another embodiment, a pocket forming system is provided. The pocket forming system includes a thermal forming die and at least one spacer. The thermal forming die has opposed first and second surfaces and at least one cavity of a select shape. The die further has an opening to each cavity through the first surface. The at least one spacer has at least one internal passage. Moreover, the at least one spacer is configured and arranged to be selectively coupled to the die such that the at least one internal passage of the at least one spacer aligns with an associated opening to the cavity in the die. The at least one internal passage is defined by a surface that is at least in part graduated. Selectively coupling the at least one spacer to the die increases a size of thermally formed pockets formed with the pocket forming system.

In still yet another embodiment, a method of forming packages with thermal sectional die is provided. The method includes: selecting a thermal die having at least one cavity of a desired shape; determining a number of inserts to couple to the die to achieve a desired pocket size for a formed package, each insert has at least one internal passage shaped the same as an opening to the at least one cavity in the die; coupling the select number of inserts to the die such that the internal passage of the at least one insert aligns with the opening to the at least one cavity of the die; and forming at least one pocket of a package in the internal passage of the at least one die and the at least one cavity.

BRIEF DESCRIPTION OF THE DRAWINGS

The present invention can be more easily understood and further advantages and uses thereof will be more readily apparent, when considered in view of the detailed description and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Figure 1A:
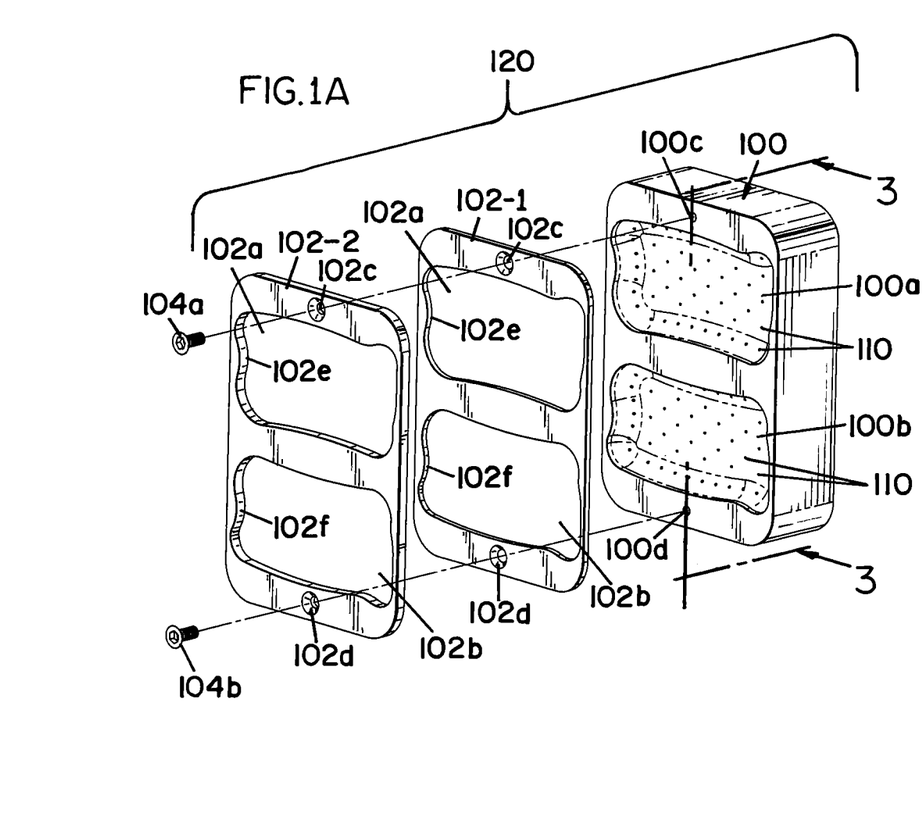
FIG. 1A is an unassembled side perspective view of a thermal die assembly of one embodiment of the present invention.
Figure 1B:
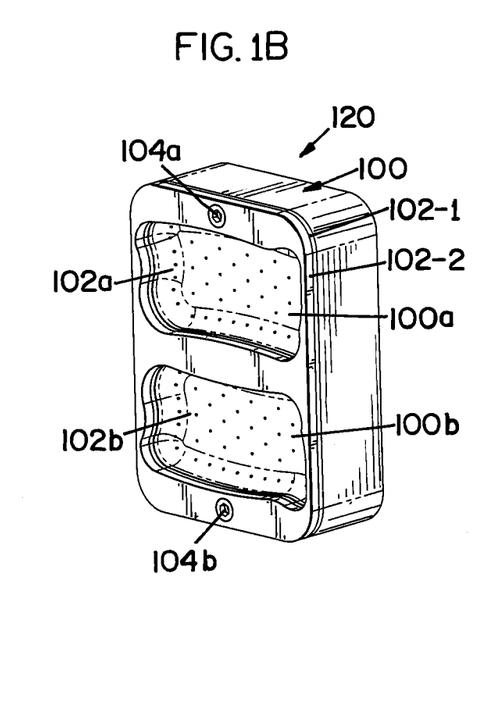
FIG. 1B is an assembled side perspective view of the thermal die assembly of FIG. 1.
Figure 2:
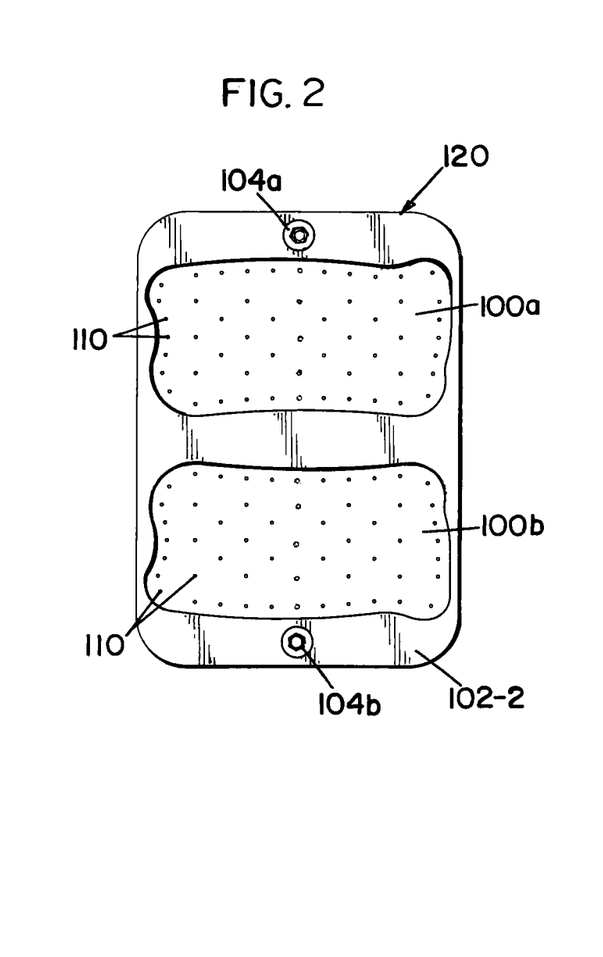
FIG. 2 is a top view of the thermal die assembly shown in FIG. 1A.
Figure 3:
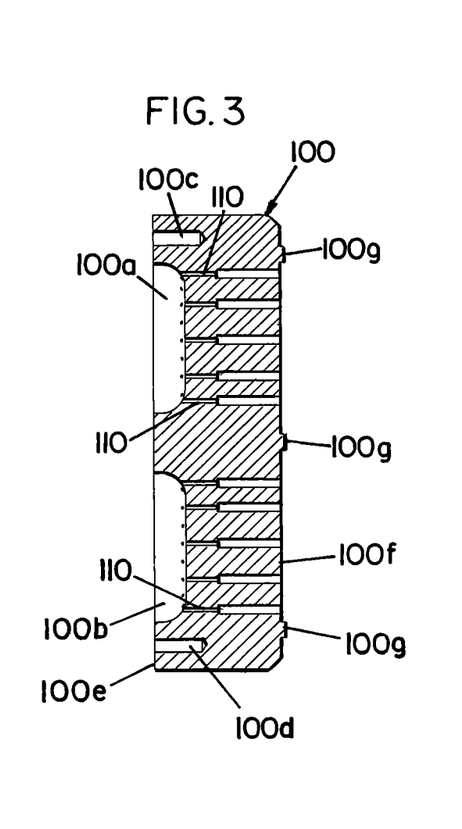
FIG. 3 is a cross-sectional side view of the die of FIG. 1A along line 3-3.

Embodiments of the present invention provide a thermal forming die assembly that is capable of adjusting in size to form different sized thermally formed pockets of packages. Hence, unlike current systems that require the exchange of dies with different sized cavities to create different size packages, in embodiments of the present invention, a single die is designed to be modified to form different size packages so that an exchange of dies is not needed when different size packages are required. An example of a thermal die assembly 120 of an embodiment is illustrated in the unassembled side perspective view of FIG. 1A. The thermal die assembly 120 in an assembled configuration is illustrated in FIG. 1B. The thermal die assembly 120 includes a die 100. The die 100 in this example embodiment has two cavities 100a and 100b in which to form pockets of packages. The thermal die assembly 120 is further illustrated in the top view of FIG. 2 and the die 100 itself is illustrated in the cross-sectional side view of FIG. 3. The die 100 also includes a first surface 100e in which openings to the cavities 100a and 100b are provided and a second surface 100f. The second surface 100f is positioned on an opposed die of the die 100 in relation to the first surface 100e. A plurality of vacuum passages 110 extend between the cavities 100a and 110b and the second surface 100f. The vacuum passages 110 are used to supply a vacuum to form webbing that is used to form the pockets of the packages. The vacuum pulls the form webbing into the cavities during a thermal forming process as is further discussed below in detail.

The die 100 in this embodiment includes threaded bores 100c and 100d that are used to couple the spacers 102-1 and 102-2 to the die 100. The spacers 102-1 and 102-2 can also be referred to as inserts. The inserts 102-1 and 102-2 are used to increase a depth of the cavities 100a and 100b so that larger pockets of packages can be formed in the cavities 100a and 100b of the die 100. Although, only two inserts 102-1 and 102-2 are shown, any number of inserts (generally designated as 102) can be used depending on the formed package volume desired. Hence, only one insert may be used or several inserts 102 could be used depending on the desired size of a pocket of the package formed in the die. Each insert 102 includes an internal passage 102a and 102b that has a shape that conforms to a respective opening to the cavities 100a and 100b in the die 100. When the inserts 102 are coupled to the die 100, the internal passages 102a and 102b align with the openings to the cavities 100a and 100b thereby extending the depth of cavities, including die cavities 100a and 100b and passages 102a and 102b of the inserts 102, of the thermal die assembly 120 as illustrated in the assembled view of FIG. 1B.

In some embodiments, the passages 102a and 102b (i.e. surfaces 102e and 102f that define the passages 102a and 102b) are graduated in shape to conform to the shape of a product that is going to be placed in the pocket. That is, if a products width either increases or decreases in relation to its height, graduated passages 102a and 102b of the inserts 102 help form pockets to accommodate the shape of the increasing or decreasing width of the product. For example, if the product has areas that flares wider in portions that would extend beyond the opening to the cavities 100a and 100b (if the product was placed in the cavities 100a and 100b) the respective passages 102a and 102b will be graduated wider along surfaces 102e and 102f to accommodate the wider portions of the product being placed in a formed pocket. Likewise if a portion of the product that extends beyond the opening to the passages 102a and 102b (if the product was placed in the cavities 100a and 100b) narrows in areas, the respective passages would be graduated narrower along the surfaces 102e and 102f to accommodate the narrower areas of the product being placed in a formed pocket. Hence in some embodiments, the inserts 102 either alone or in combination help form a conforming pocket of a package to a product with the use of graduated surfaces 102e and 102f. Each insert 102 includes retaining apertures 102c and 102d. Fasteners 104a and 104b, such as but not limited to, threaded screws, are passed through the retaining apertures 102c and 102d and are threadably engaged with the thread bores 100c and 100d of the die 100 to couple the inserts 102 to the die 100. The length of the fastener is selected depending on the number of inserts 102 used and the depth of the threaded bores 100c and 100d in the die 100.

Figure 4:
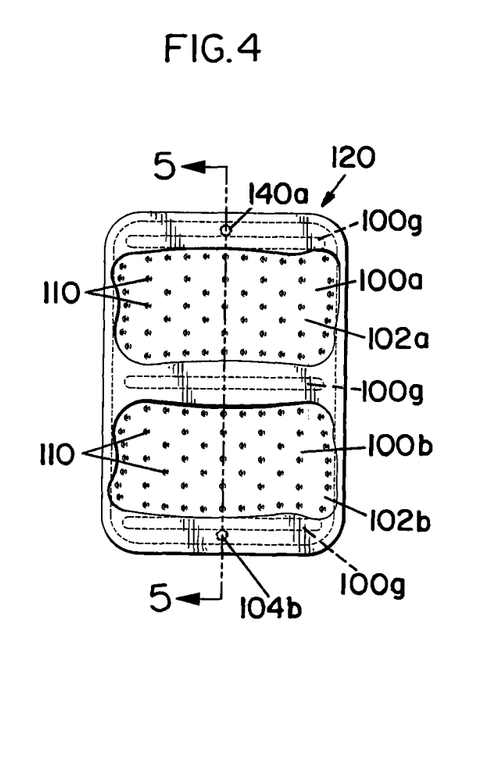
FIG. 4 is a top view of the assembled thermal die assembly of FIG. 1B.
Figure 5:
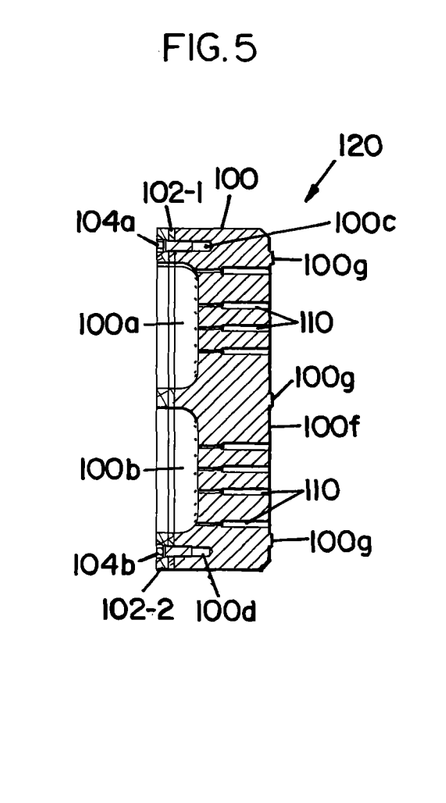
FIG. 5 is a cross-sectional side view of the assembled thermal die assembly of FIG. 4 along line 5-5.
Figure 6:
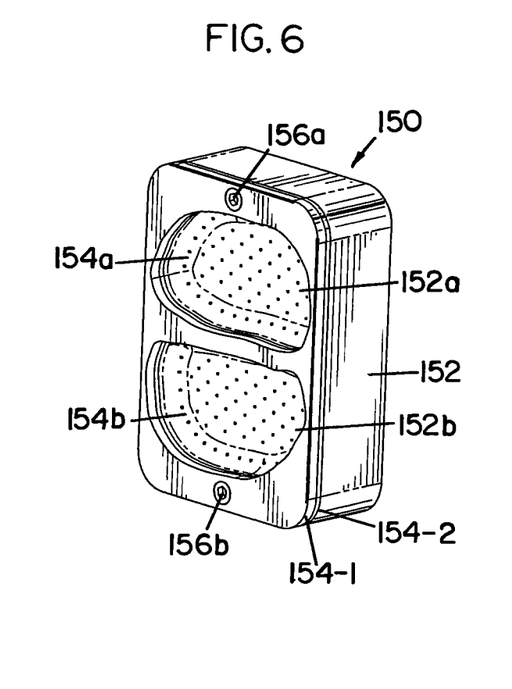
FIG. 6 is an assembled side perspective view of another embodiment of a thermal die assembly of the present invention.

FIG. 4 illustrates an assembled top view of thermal die assembly 120. As illustrated, the passages 102a and 102b are aligned with openings to the cavities 100a and 100b in die 100. FIG. 5 is a cross-sectional side view along line 5-5 of FIG. 4. FIG. 5 illustrates the fasteners 104a and 104b coupling the inserts 102-1 and 102-2 to the die 100. As illustrated, the inserts 102-1 and 102-2 add on to the depth of die cavities 100a and 100b in the thermal die assembly 120 thereby providing an increased internal volume in which pockets of packages can be formed. FIG. 5 further illustrates standoff feet 100g that extend from the second surface 100f of the die 100. The standoff feet 100g space the second surface 100f of the die 100 from a surface the die 100 is resting on to allow the vacuum to be applied through the vacuum passages 110. Although, the dies 100 illustrated in FIGS. 1-5 includes two cavities 100a and 100b and the inserts 102 include two passages 102a and 102b, any number of cavities per die can be used. Hence, embodiments of the die are not limited to a specific number of pocket forming cavities. As discussed above, the shape of the cavities are selected to produce a shape of a pocket of package that is desired. An example of different shaped cavities is illustrated in the thermal die assembly 150 of FIG. 6. As illustrated, in this example of the thermal die assembly 150, the die 152 has two cavities 152a and 152b that have a select shape. Two inserts 154-1 and 154-2 are coupled to the die 152 via fasteners 156a and 156b to form the thermal die assembly 150. The inserts, generally designated as 154, each include passages 154a and 154b are shaped to be aligned with openings to the cavities 152a and 152b. As with the above embodiment, the passages 154a and 154b may be graduated with respect to each other and to the opening to accommodate a desired shape of a pocket to be formed.

Figures 7A, 7B:
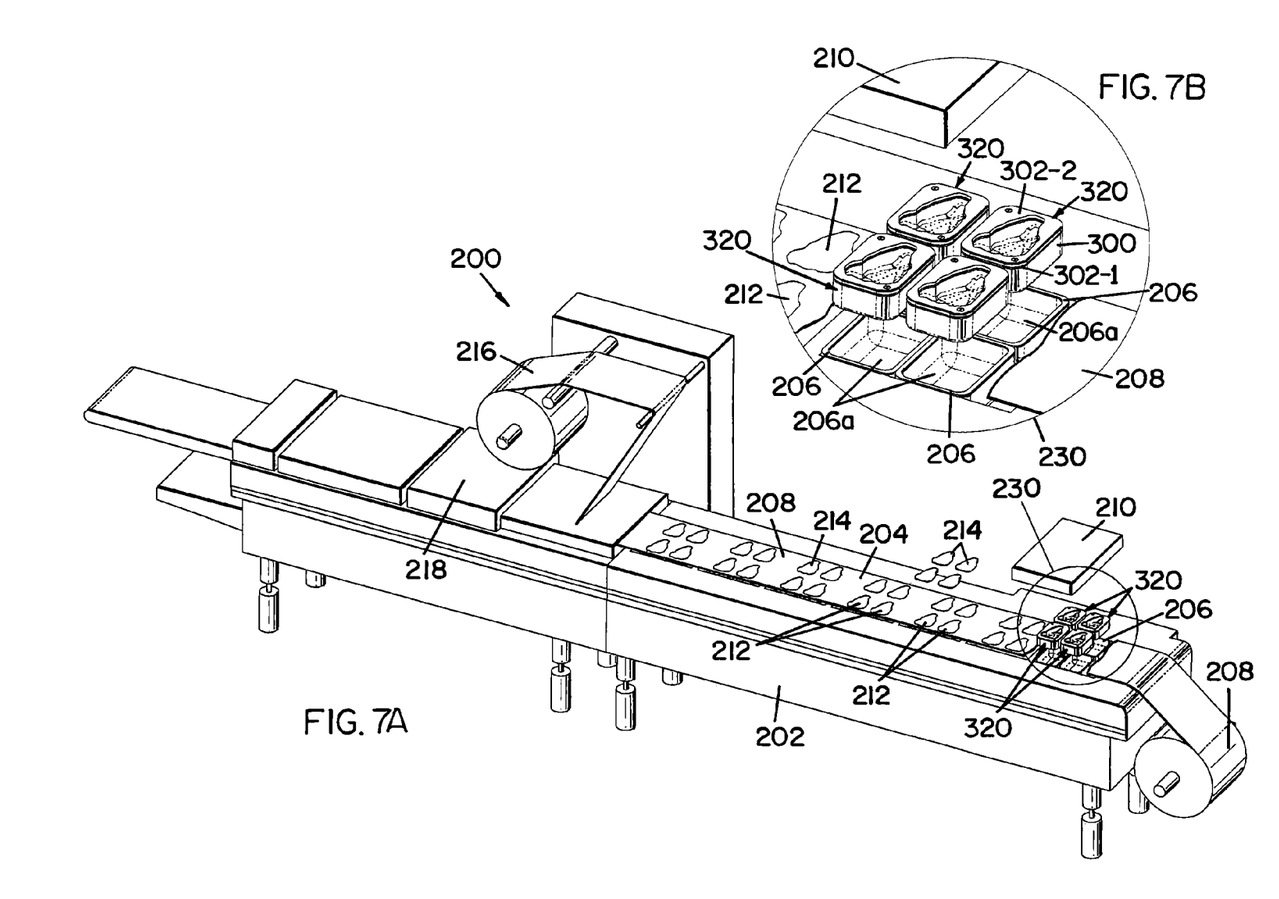
FIG. 7A is a side perspective view of a package forming system of one embodiment of the present invention.
FIG. 7B is a close up view of a portion of the package forming system of FIG. 6.

The use of thermal die assembles 320 in a thermal forming package machine 200 is illustrated in FIGS. 7A and 7B. FIG. 7B is a close up view of area 320 of FIG. 7A which illustrates details of the thermal die assemblies 320 used in this embodiment. In this embodiment, each thermal die assembly 320 includes a die 300 with a single cavity 300a. Inserts 302-1 and 302-2 are coupled to each die 300 in this example. Each insert (generally designated as 302) includes an internal passage 302a which is designed to align with an opening to a cavity 300a of an associated die 300. Similar to the embodiment discussed above, the inserts 302 add on to the depth of the cavity 300a of each die 300 to selectively increase the size of a pocket of a package being formed with the thermal die assembly 320. As discussed above, in some embodiments, the internal passage 302a of the inserts 302-1 and 302-2 are graduated. Any number of inserts 302 can be used depending on the desired size of the pocket of the package. Moreover, a plurality of inserts 302 that are used together can have internal passages 302a that are graduated with respect to each other so that products that keep expanding in width or narrowing in width along their depth can be accommodated with a formed pocket that keeps expanding or narrowing as the situation requires. In the embodiment of the thermal forming package machine 200 of FIG. 7A, each thermal die assembly 320 is placed in a die box cavity 206a of a die box 206. The die boxes 206 include vacuum passages (not shown) that allow a vacuum to be applied to vacuum passages, such as vacuum passages 110 discussed above, in the dies 300.

Once, the desired thermal die assemblies 320 are placed in their respective die box 206, the thermal forming package machine 200 can be started. A sheet of forming web 208 is used to form pockets 212. As briefly discussed above, the forming web 208 is a plastic film or sheet that has properties that allow it to melt at a select temperature to take on a select shape and then when cooled retain the shape. The forming web 208 is unwound from a reel as illustrated in FIG. 7A and guided over the thermal die assemblies 320. A pocket forming heating assembly 210 is then used to form the pockets 212 in the forming web 208. The pocket forming heating assembly 210 is raised in FIG. 7A to illustrate the positioning of the thermal die assemblies 320 in the thermal forming package machine 200. In use, the pocket forming heating assembly 210 would be positioned closely over the thermal die assemblies 320. Once the forming web 208 is placed over the thermal die assemblies 320, the pocket forming heating assembly 210 heats the forming web 208. A vacuum is then applied to pull portions of the forming web 208 into each of the cavities of the dies 300. The portions of the forming web 208 pulled into the cavities 300a of the dies 300 take on the shape of the cavities 300a and the passages 302a of any inserts used in conjunction with the dies 300. Once the portions of forming web 208 that have been pulled into the cavities 300 of the dies come in contact with internal surfaces in cavities 300a of the dies 300 and the passages 302a in the respective inserts 302, the forming web 208 cools thereby retaining the shape of the cavities 300a and the passages 302a of respective inserts 302. In some embodiments, aluminum dies and inserts are used because of aluminums ability to dissipate heat in an efficient manner. The retained shapes in the forming web 208 are the pockets 212 of the packages.

Once the pockets 212 are formed, the forming web 208 is moved along the thermal forming package machine 200 as illustrated in FIG. 7A, in a common conveyer type fashion. Product 214 is then placed in the formed pockets 212. Typically, the product 214 will be formed to have a select desired shape. The die cavities 300a are formed to produce a pocket 212 with a shape that will snuggly receive the product 214. Once the products are placed in the pockets 212, the forming web 208 is passed along to a ceiling head assembly 218. A non-forming web 216 is dispensed from a roll as illustrated in FIG. 7A. The non-forming web 216 is placed over the forming web 208 in the ceiling head assembly 218. The ceiling head assembly 218 heats and vacuum seals the non-forming and forming webbing 216 and 208 about the formed pockets 212 in the forming web 208. Formed vacuum sealed packages (not shown) with product 214 are then cut out of the non-forming and non-forming webbing 208 and 216 to create a product package to be sold to a consumer.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A thermal die assembly comprising:
a thermal forming die having at least one die forming cavity of a select shape, the die forming cavity of the thermal forming die configured and arranged to form a pocket of a plastic package, the die having at least one opening to the at least one die cavity; and
a plurality of inserts, each insert having at least one internal passage, each insert configured and arranged to be selectively coupled to the die with the insert's at least one internal passage aligning with the at least one opening of the at least one die forming cavity, at least two inserts of the plurality of inserts configured to be used together to selectively change the shape of a forming cavity and increase a depth of the die forming cavity of the thermal forming die.

2. The thermal die assembly of claim 1, further comprising:
at least one fastener to couple the plurality of inserts to the thermal forming die.

3. The thermal die assembly of claim 2, wherein the at least one fastener includes a threaded screw configured to threadably engage a threaded bore in the thermal forming die.

4. The thermal die assembly of claim 1, wherein the thermal forming die includes a plurality of vacuum passages that extend from a first external surface into the die forming cavity.

5. The thermal die assembly of claim 4, wherein the first external surface is in an opposed fashion to a second external surface, the second external surface of the thermal forming die including the at least one opening of the die forming cavity.

6. The thermal die assembly of claim 1, wherein the at least one internal passage of at least one insert is graduated.

7. A pocket forming system comprising:
a thermal forming die having opposed first and second surfaces and at least one cavity of a select shape, the at least one cavity of the thermal forming die configured and arranged to form a pocket of a plastic package, the die further having an opening to each cavity through the first surface; and
a plurality of spacers, each spacer having at least one internal passage, each spacer configured and arranged to be selectively coupled to the die such that the at least one internal passage of each spacer aligns with an associated opening to an associated cavity in the die, the at least one internal passage of at least one spacer being defined by a surface that is at least in part graduated to change the shape of at least one thermally formed pocket of the pocket forming system, at least two spacers of the plurality of spacers used together to selectively increase a size of the at least one thermally formed pocket of the pocket forming system.

8. The pocket forming system of claim 7, wherein the plurality of spacers have their internal passages configured and arranged to conform the at least one thermally formed pocket of the pocket forming system to at least a portion of a shape of a product.

9. The pocket forming system of claim 7, further comprising:
at least one fastener configured to couple the plurality of spacers to the die.

10. The pocket forming system of claim 7, wherein further comprising:
the die having at least one threaded bore;
each spacer having at least one retaining aperture; and
at least one threaded screw configured to pass through the at least one retaining aperture of each spacer and threadably engage the at least one bore in the die to couple the at least one spacer to the die.

11. The pocket forming system of claim 7, wherein the die has a plurality of vacuum passages extending from an associated cavity to the second surface of the die.

12. The pocket forming system of claim 11, wherein the die further includes a plurality of standoff feet extending from the second surface of the die.

13. A thermal die assembly comprising:
a thermal forming die having at least one die cavity of a select shape that forms a forming cavity, the forming cavity of the thermal forming die configured and arranged to form a pocket of a plastic package, the die having at least one opening to the forming cavity, the thermal forming die including a plurality of vacuum passages that extend into the forming cavity, the forming cavity of the thermal forming die and the plurality of vacuum passages configured and arranged to form a forming web into a pocket of a package; and
a plurality of inserts, each insert having at least one internal passage, at least two inserts of the plurality of inserts configured to be used together, the at least two of the inserts configured and arranged to be selectively coupled to the die with the at least one internal passage of each insert aligning with the at least one opening of the at least one die cavity to selectively increase a depth of the forming cavity of the thermal forming die thereby selectively changing the size and shape of the formed pocket of the package.

14. The thermal die assembly of claim 13, further comprising:
at least one fastener to couple each insert to the thermal forming die.

15. The thermal die assembly of claim 13, wherein the at least one internal passage of at least one insert is graduated.

* * * * *